United States Patent [19]

Sieghartner

[11] 4,155,559

[45] May 22, 1979

[54] DEFORMABLE SEAL FOR ROTARY MECHANISM

[76] Inventor: Leonard J. Sieghartner, R.R. 1, Coal Valley, Ill. 61240

[21] Appl. No.: 789,106

[22] Filed: Apr. 20, 1977

[51] Int. Cl.² .................................................. F16J 15/38
[52] U.S. Cl. ...................................... 277/93 R; 277/228
[58] Field of Search ............... 277/228, 93 R, 93 SD, 277/81 R

[56] References Cited

U.S. PATENT DOCUMENTS

| | | | |
|---|---|---|---|
| 3,322,433 | 5/1967 | Rentschler | 277/228 |
| 3,549,156 | 12/1970 | VanVleet | 227/228 |
| 3,660,192 | 5/1972 | Smith | 277/228 |
| 3,765,689 | 10/1973 | Adams | 277/93 R |
| 3,806,135 | 4/1974 | Wiese | 277/93 |
| 4,007,940 | 2/1977 | Chapa | 277/93 R |

Primary Examiner—Robert I. Smith

[57] ABSTRACT

A floating annular sealing ring having a plastic coated surface is adapted to be received by an annular groove defined by a bushing and shaft sleeve mounted upon a rotating shaft to provide an effective liquid and gas seal. The encapsulated deformable annular seal may include a circular, an oval, a lobed, a rectangular, a square or triangular cross-section, which cross-section is capable of conforming to the inside surface of the bushing sleeve and the outside surface of the shaft when the sleeve is moved axially towards the bushing to thereby deform the encapsulated floating annular seal to provide a mechanical seal between the rotating shaft, sleeve and bushing.

18 Claims, 11 Drawing Figures

DEFORMABLE SEAL FOR ROTARY MECHANISM

BACKGROUND OF THE INVENTION

The present invention relates in general to sealing means for axially confined annular grooves defined by a bushing and a shaft sleeve adapted to receive a rotating shaft, and has particular application to sealing means for rotating pump shafts.

In the past it has been the practice to employ packing or gaskets or O-rings for sealing rotating shafts of pumps confined within rotating bushing or sleeves. However, such packing and gaskets have prevented the pumping of liquids and fluids which are not compatable with the material comprising the packing or gaskets or O-rings. Thus, the inability of such pump assemblies to pump noxious and corrosive chemicals which attack and destroy the packing or gasket or O-ring seal has severely restricted their wide-spread application and adoption. Also, the space limitations and the dimensions of the annular groove between the rotating shaft, bushing and sleeve, have prevented the utilization of existing gland-type seals with the clamping devices thereon within the annular groove because such gland seals are bulky and require a large amount of space to perform the intended sealing function. Thus, the failure of such annular grooves to provide sufficient area for the gland seals, it has heretofore been impossible to utilize gland seals. Accordingly, such gland seals have been unacceptable in pumping assemblies for pumping corrosive chemicals.

Furthermore, the utilization of conventional O-rings to provide an effective seal between the bushing and the sleeve on the rotating shaft within a pumping assembly has proven undesirable because conventional O-rings take a compression set after repreated pressure loadings. Thus, conventional O-ring seals are not desirable because the O-ring seals are not sufficiently elastic nor are they resistive to solvents or chemicals. Consequently, the adoption of O-rings in pumping assemblies to pump corrosive chemicals has been severely restricted.

SUMMARY OF THE INVENTION

One object of the present invention is to provide an improved seal for an annular groove defined by bushing and shaft sleeve mounted upon a rotating shaft.

It is another object of the present invention to utilize a plastic encapsulated or hollow metallic floating annular sealing ring as an improved seal in an annular groove defined by a bushing and a shaft sleeve mounted upon a rotating shaft.

It is a further object of the present invention to provide an improved seal of a plastic encapsulated or hollow metallic floating annular sealing ring which is capable of taking a plastic deformation and is resistant to corrosive chemicals but is subject to a compression set.

It is still a further object of the present invention to provide a mechanical seal of a plastic encapsulated or hollow metallic floating annular sealing ring having a plurality of cross-sectional configurations.

In accordance with one embodiment of the present invention, a typical balanced sealed pump assembly includes a rotating shaft mounted within a pump housing and having the shaft sleeve surrounding the shaft and driven thereby by a pin connecting the shaft to the shaft sleeve. The shaft sleeve has a forward extension thereon which is free to axially slide on an auxiliary sleeve or bushing. A groove is located intermediate the length of the shaft with a snap ring positioned within the groove on the shaft to confine the shaft sleeve and auxiliary sleeve assembly within predetermined axial and longitudinal movement with respect to the rotating shaft. The inside surface of the forward extension of the shaft sleeve defines the outer surface of an annular groove and the outside surface of the rotating shaft defines the inner surface of the annular groove, with the opposing faces of the shaft sleeve and auxiliary sleeve providing opposing sidewalls of the annular groove.

The floating annular sealing ring of the present invention is comprised of an annular shaped material which is encapsulated within a plastic material, such as Teflon, a trademark of the DuPont Co., and other types of resinous material. It has been found that Teflon encapsulated sealing rings are most desirable because such fluorocarbon resinous materials are chemically inert to almost all reagents including aqueous alkalies, acids, oxidizing agents and organic solvents except molten alkali metals. The annular seal is positioned in the annular groove such that the seal floats or is loosely positioned within the annular groove. Importantly, the cross-section of the annular sealing ring may take various physical forms. For example, the cross-section may be rounded as an O-ring, lobed or quad, square, rectangular, oval or triangular in configuration. Furthermore, the cross-sectional annular sealing ring may be composed of a synthetic material or may be of metallic construction, such as a pressurized hollow stainless steel. The important feature of the encapsulated sealing ring is that chemicals and solvents are prevented from penetrating to the elastic core of the annular sealing ring.

In still another embodiment of the present invention, a bushing type arrangement is adapted to be received by the pump housing and includes a bushing or seat having a forward extension which is engageable with an auxiliary sleeve which defines an annular groove between the bushing and auxiliary sleeve with the opposing faces of the bushing and auxiliary sleeve providing opposing sidewalls of the annular groove. The plastic encapsulated annular sealing ring is inserted in the annular groove such that the sealing ring floats therein. During the operation of the pumping mechanism, the hydraulic and seal spring pressure acting upon the bushing causes the bushing to laterally move towards the auxiliary sleeve thereby reducing the distance between the opposing sidewalls and narrowing the width of the annular groove. The compression of the floating plastic encapsulated annular sealing ring by the bushing causes the sealing ring to expand outwardly and inwardly to provide a uniform and tightly fitting mechanical seal on the inner surface of the housing and the outer surface of the forward extension of the bushing. It must be pointed out that a step turned in the pump housing may suffice for the O-ring to press against. However, the addition of the auxiliary sleeve permits use of this device in a housing adapted for a conventional soft O-ring without change.

Thus, the present invention has applicability to providing a deformable mechanical seal for a plurality of sealing operations where a bushing or sleeve is laterally movable with respect to an auxiliary sleeve and which define an annular groove therein. The reduction of the distance between the sidewalls of the annular groove compresses the floating plastic encapsulated sealing ring to cause the ring to provide an effective mechanical seal within the annular groove. The return of the sleeve or bushing away from the auxiliary sleeve returns the deformable plastic encapsulated sealing ring to its original floating position to prepare the annular sealing ring for the next sealing operation.

BRIEF DESCRIPTION OF THE DRAWINGS

FIG. 6A shows the compressed annular sealing ring of FIG. 6 to provide the mechanical seal in accordance with the present invention.

DETAILED DESCRIPTION

Figure 1:
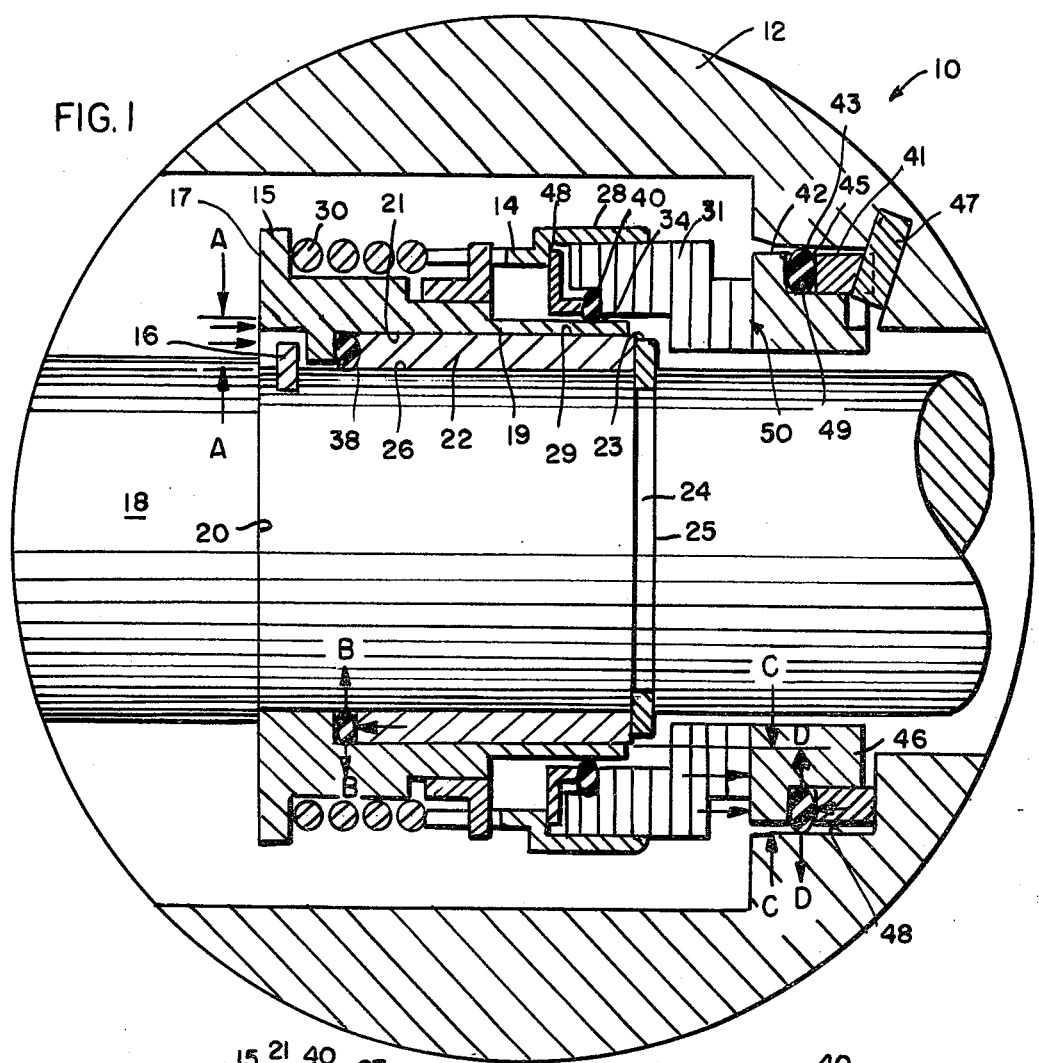
FIG. 1 is an enlarged cross-sectional view showing the application of the encapsulated annular sealing ring in accordance with the present invention in a pumping mechanism.
Figure 2:
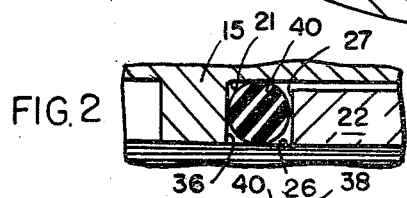
FIG. 2 is an expanded cross-sectional view of a plastic encapsulated sealing ring having a circular or O-ring cross-section inserted into the annular groove defined by a shaft sleeve and an auxiliary sleeve in accordance with the present invention.
Figure 2A:
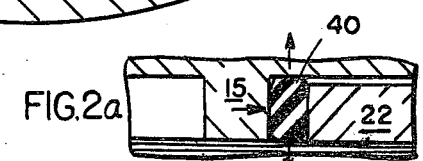
FIG. 2A shows the compressed annular view of the sealing ring of FIG. 2 to provide the mechanical seal in accordance with the present invention.
Figure 3:
FIG. 3 is an expanded cross-sectional view of a plastic encapsulated sealing ring having an oval cross-section inserted into the annular groove defined by a shaft sleeve and an auxiliary sleeve in accordance with the present invention.
Figure 3A:
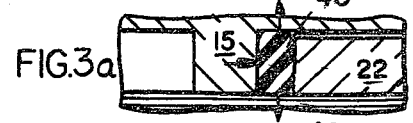
FIG. 3A shows the compressed annular sealing ring of FIG. 3 to provide the mechanical seal in accordance with the present invention.
Figure 4:
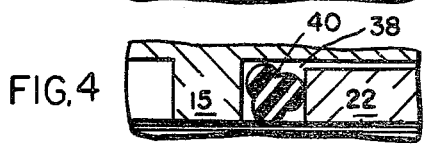
FIG. 4 is an expanded cross-sectional view of a plastic encapsulated annular seal having a lobed cross-section inserted into the annular groove defined by a shaft sleeve and an auxiliary sleeve in accordance with the present invention.
Figure 4A:
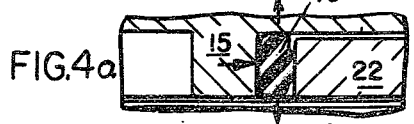
FIG. 4A shows the compressed annular sealing ring of FIG. 4 to provide the mechanical seal in accordance with the present invention.
Figure 5:
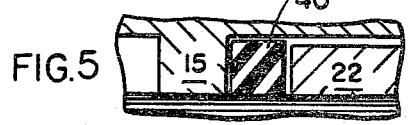
FIG. 5 is an expanded cross-sectional view of a plastic encapsulated annular ring having a square cross-section inserted through the annular groove defined by a shaft sleeve and an auxiliary sleeve in accordance with the present invention.
Figure 5A:
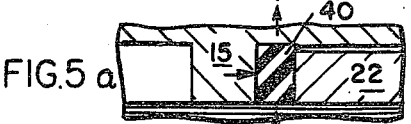
FIG. 5A shows the compressed annular sealing ring of FIG. 5 to provide the mechanical seal in accordance with the present invention.

Referring now to the drawings wherein like numerals have been employed throughout the various views to designate the same or similar components, in FIG. 1 a partial pumping assembly 10 is fragmentarily shown and includes a pump housing or casing 12. The pumping assembly 10 includes a complete rotary unit, designated as 14, which comprises a shaft sleeve 15 connected by a sleeve drive pin 16 to a rotating shaft 18 that extends the length of the pumping assembly. The shaft sleeve end 17 of shaft sleeve 15 is designed to abut shoulder 20, which is machined to shaft 18, to thereby confine the lateral axial movement of shaft sleeve 15. The shaft sleeve 15 has a face surface 36 (FIG. 2) and further includes a forward extension portion 19 having an inner annular surface 21 thereon. An auxiliary sleeve 22 having an outer surface 29 thereon is journaled to the pump shaft 18 and the end 23 thereof is engageable with the shaft snap ring 24 positioned in a groove 25 located intermediate the length of shaft 18. The auxiliary sleeve 22 includes an end face 27 opposite the end 23.

The inner surface 21 of the shaft sleeve 15 is adapted to be engageable with the outer surface 29 of the auxiliary sleeve 22 and permits the shaft sleeve 15 to axially slide and move upon the outer surface 29 of the auxiliary sleeve 22 during the operation of the pumping assembly 10. The positioning and journaling of the shaft sleeve 15 and the auxiliary sleeve 22 upon rotating shaft 18 defines an annular groove 38 between the end face 27 of auxiliary sleeve 22 and face surface 36 of the shaft sleeve 15, with the outer and inner surfaces of the annular groove 25 being defined by the inner annular surface 21 of the forward extension of shaft sleeve 15 and the outer surface 26 of rotating shaft 18, respectively. Thus, the opposing faces 27 and 36 of the auxiliary sleeve 22 and the shaft sleeve 15 provide the sidewalls of the annular groove 25.

The rotating pumping unit 14 includes a drive band 28 positioned outwardly of the shaft sleeve 15. The drive band 28 is operatively connected with the shaft sleeve 15 by spring member 30 and operatively engageable with an annular follower ring 48 which is slidably positioned about the forward extension portion 19 of the shaft sleeve 15. An annular groove 34, defined between the follower ring 48 and the seal ring 31, is adapted to receive the sealing ring of the present invention, as will hereinafter be described.

Figure 6:
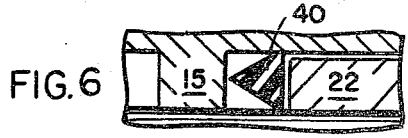
FIG. 6 is an expanded cross-sectional view of a plastic encapsulated annular seal having a triangular cross-section inserted into an angular groove defined by the shaft sleeve and auxiliary shaft in accordance with the present invention.
Figure 5A:
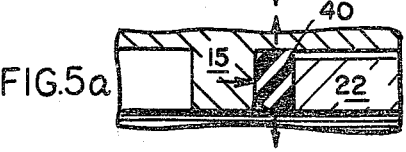

The plastic encapsulated annular sealing ring 40 is freely positioned to float within the annular groove 38 to approximate the position as shown in FIGS. 2, 3, 4, 5 and 6. As shown, the cross-section configuration of the annular sealing ring 40 may be an O-ring or circular configuration, (FIG. 2), an oval configuration (FIG. 3), a lobed configuration (FIG. 4), a square or rectangular configuration (FIG. 5), and a triangular configuration (FIG. 6). The plastic encapsulated sealing ring is composed of a resinous material, such as Teflon, a trademark of the DuPont Company, which possesses chemical inertness and high lubricity characteristics. It has been found that Teflon encapsulated sealing rings are most desirable because the fluorcarbon resinous materials are chemically inert to almost all chemical reagents including aqueous alkalies, acids, oxidizing agents and organic solvents except molten alkali metals. Also, the cross-sectional annular sealing ring may be composed of a synthetic material or may be of a metallic construction, for example, a pressurized hollow stainless steel. The plastic encapsulated annular sealing ring 40 must provide plastic deformation when the operation of the pumping unit 14 results in hydraulic forces acting upon the area on the line A—A, as shown in FIG. 1, to thereby cause the shaft sleeve 15 to axially move towards the auxiliary sleeve 22 thereby reducing the distance between the sidewalls of the annular groove 38 and to compress the annular sealing ring 40. The compression causes the sealing ring 40 to expand and to mechanically seal against the inner surface 21 of the shaft sleeve 15 and the outer surface 26 of the pump shaft 18, as shown in line B—B of FIG. 1 and as shown in FIGS. 2A, 3A, 4A, 5A and 6A.

Similarly, when the annular sealing ring 40 is loosely positioned to float in the annular groove 34 defined by the seal ring 31 and the seal follower ring 48, the axial movement of the drive band 28 towards the seal seat 42 results in the follower ring 48 axially moving towards the seal ring 31 to compress the plastic encapsulated sealing ring to mechanically seal the seal ring 31 to the forward extension portion 19 of the shaft sleeve 15.

In a further embodiment of the mechanical seal of the present invention, the plastic encapsulated annular seal 49 is positioned in an annular groove 45 defined by a bushing or stationary seat 42 having a shoulder portion 43 thereon. The forward extension 46 is engaged with a seal seat auxiliary sleeve 41 which is mounted to the pump housing 12 by a stationary seal seat drive pin 47. The floating annular sealing ring 40 is freely positioned in the annular groove 45 and the compression pressure derived from the seal spring 30 and the hydraulic pressure acting upon the bushing or stationary seat end surface 50 results in the bushing axially moving towards the auxiliary sleeve 41, a position as shown by line C—C in FIG. 1, thereby compressing the annular sealing ring 40 within the annular groove 45, to a position as shown by line D—D in FIG. 1. Thus, during compression the sealing ring 40 is compressed outwardly to the inner surface 48 of the housing or casing 12 and inwardly to engage the outer surface 44 of the bushing or stationary seat 42 to mechanically seal the bushing and sleeve. The arrangement and structure of the bushing or stationary seat and the sleeve permits the forward extension 46 to freely axially move on the seal seat auxiliary sleeve 41 to compress the annular sealing ring to provide the mechanical seal in accordance with the present invention.

The plastic encapsulated annular sealing ring 40 of the present invention is effective in mechanically sealing annular grooves defined by a sleeve and bushing which are journaled to a rotating shaft and is particularly useful when mechanically sealing the annular groove against corrosive chemicals and solvents. The plastic useful in coating and encapsulating the annular sealing ring is preferably a fluorocarbon resinous material which possess chemical inertness and which is capable of plastic deformation time and time again. Additionally the annular sealing ring does not need to readily conform to the walls of the annular groove defined by the sleeve of the shaft surface and thus does not form an initial seal when inserted into the annular groove defined by the sleeve or surface. That is, they are not required to provide an initial seal in accordance with the O-ring sealing principle.

A further factor to consider when utilizing plastic encapsulated annular sealing rings is that the annular sealing ring must possess the capability of providing a plastic deformation after a plurality of sealing operations.

It has been clearly understood from the above discussion that the mechanical seal provides a unique plastic deformation when one of the side walls of the annular groove laterally moves to compress the annular seal. During the compression of the annular seal, the annular seal expands outwardly to engage the inner surface of the shaft sleeve or the annular groove and expands inwardly to seal about the rotating shaft. Thus, the present invention has application in any environment wherein a rotating shaft is journaled by a sleeve or bushing with the sleeve defining an annular groove about the rotating shaft.

What has been described therefore, is a mechanical seal for use with a rotating shaft journaled by a sleeve or bushing. The mechanical seal has a plastic encapsulated annular seal member having a cross-section of varying geometrical designs such as circular, oval, lobed, triangular, square. The geometrical cross-section configuration is only limited by the degree of deformability possessed by the plastic encapsulated annular seal when one of the sidewalls of the annular groove deforms the sealing ring to provide the mechanical seal with the inner surface with the outer surface of the annular groove and the inner surface of the annular groove.

I claim:

1. A rotary mechanism for use with a pumping assembly, including in combination:
   a rotating shaft extending the length of the pumping assembly,
   a bushing shaft sleeve operatively connected to said rotating shaft for axial movement thereon and having a forward extension having an inner annular surface thereon,
   an auxiliary sleeve journaled to said rotating shaft and having an outer annular surface thereon slidably engageable with said inner annular surface of said bushing shaft sleeve, said auxiliary sleeve being further spaced apart from said bushing shaft sleeve to define an annular groove between said bushing shaft sleeve and said auxiliary sleeve having an outer annular surface defined by said inner annular surface of said forward extension of said bushing shaft sleeve and an inner annular surface defined by the outer surface of said rotating shaft, and
   a mechanical seal comprising an encapsulated annular seal means loosely positioned in said annular groove when said rotating shaft is in the at-rest position, said annular seal means being resiliently compressed by said bushing shaft sleeve upon the axial movement thereof towards said auxiliary sleeve when said rotary shaft is actuated, said deformation of said encapsulated annular seal means maintaining said annular seal means against the outer annular surface of said annular groove and against the inner annular surface of said annular groove to mechanically seal the same.

2. The rotary mechanism in accordance with claim 1, wherein said encapsulated annular seal means is encapsulated with a plastic material.

3. The rotary mechanism in accordance with claim 2 wherein said plastic material comprises a fluorocarbon resinous material.

4. The rotary mechanism in accordance with claim 3 wherein said fluorocarbon resinous material is Teflon.

5. The rotary mechanism in accordance with claim 1 wherein the cross-section of said encapsulated annular seal means is an O-ring configuration.

6. The mechanical seal in accordance with claim 5 wherein said O-ring configuration is comprised of hollow stainless steel.

7. The rotary mechanism in accordance with claim 1 wherein the cross-section of said encapsulated annular seal means is a circular configuration.

8. The rotary mechanism in accordance with claim 1 wherein the cross-section of said encapsulated annular seal means is an oval configuration.

9. The mechanical seal in accordance with claim 1 wherein the cross-section of said encapsulated annular seal means is a lobed configuration.

10. The mechanical seal in accordance with claim 1 wherein the cross-section of said encapsulated annular seal means is a rectangular configuration.

11. The mechanical seal in accordance with claim 1 wherein the cross-section of said encapsulated annular seal means is a triangular configuration.

12. A rotary mechanism for use with a pumping assembly, including in combination:
- a housing, including a shoulder portion having an inner annular surface thereon,
- a rotating shaft extending the length of said housing,
- a bushing shaft sleeve operatively connected to said rotating shaft for axial movement thereon and having a forward extension having an outer annular surface thereon,
- an auxiliary sleeve mounted to said housing and having an inner annular surface thereon slidably engageable with said outer annular surface of said bushing shaft sleeve, said auxiliary sleeve being further spaced apart from said bushing shaft sleeve to define an annular groove between said bushing shaft sleeve and said auxiliary sleeve having an inner annular surface defined by said outer annular surface of said forward extension of said bushing shaft sleeve and an outer annular surface defined by the inner surface of said shoulder portion of said housing, and
- a mechanical seal comprising an encapsulated annular seal means loosely positioned in said annular groove when said rotating shaft is in the at-rest position, said annular seal means being resiliently compressed by said bushing shaft sleeve upon the axial movement thereof towards said auxiliary sleeve when said rotary shaft is actuated, said deformation of said encapsulated annular seal means maintaining said annular seal means against the outer annular surface of said annular groove and against the inner annular surface of said annular groove to mechanically seal the same.

13. The rotary mechanism in accordance with claim 12 wherein said encapsulated annular seal means is encapsulated with a plastic material.

14. The rotary mechanism in accordance with claim 13 wherein said plastic material comprises a fluorocarbon material.

15. The rotary mechanism in accordance with claim 14 wherein said fluorocarbon resinous material is Teflon.

16. The rotary mechanism in accordance with claim 12 wherein the cross-section of said encapsulated annular seal means is an O-ring configuration.

17. The rotary mechanism in accordance with claim 12 wherein the cross-section of said encapsulated annular seal means is a circular configuration.

18. The rotary mechanism in accordance with claim 12 wherein the cross-section of said encapsulated annular seal means is an oval configuration.

* * * * *